US011967795B2

(12) United States Patent
Glockseisen et al.

(10) Patent No.: US 11,967,795 B2
(45) Date of Patent: Apr. 23, 2024

(54) CRIMPING PLIERS DIE AND CRIMPING PLIERS

(71) Applicant: WEZAG GmbH & Co. KG, Stadtallendorf (DE)

(72) Inventors: Thomas Glockseisen, Düsseldorf (DE); Roman Zinser, Neustadt (DE)

(73) Assignee: WEZAG GmbH & Co. KG, Stadtallendorf (DE)

( * ) Notice: Subject to any disclaimer, the term of this patent is extended or adjusted under 35 U.S.C. 154(b) by 465 days.

(21) Appl. No.: 17/240,024

(22) Filed: Apr. 26, 2021

(65) Prior Publication Data

US 2021/0336400 A1 Oct. 28, 2021

(30) Foreign Application Priority Data

Apr. 28, 2020 (EP) .................................... 20171789

(51) Int. Cl.
*H01R 43/05* (2006.01)
*H01R 43/042* (2006.01)
*H01R 43/058* (2006.01)

(52) U.S. Cl.
CPC ......... *H01R 43/058* (2013.01); *H01R 43/042* (2013.01)

(58) Field of Classification Search
CPC ............. H01R 43/042; H01R 43/0428; H01R 43/058; H01R 43/0425; B21D 39/04; B21D 39/048; B25B 24/146
See application file for complete search history.

(56) References Cited

U.S. PATENT DOCUMENTS

| | | | |
|---|---|---|---|
| 4,283,933 A | 8/1981 | Weiner | |
| 4,381,661 A | 5/1983 | Weiner | |
| 6,151,950 A | 11/2000 | Wilhelm | |
| 8,601,856 B2 * | 12/2013 | Battenfeld | H01R 43/042 72/461 |
| 2015/0180190 A1 | 6/2015 | Dierks | |
| 2020/0251869 A1 * | 8/2020 | Weisheit | B25B 27/146 |

FOREIGN PATENT DOCUMENTS

| | | |
|---|---|---|
| DE | 31 09 289 C2 | 8/1987 |
| DE | 2007 005 176 A1 | 8/2008 |
| DE | 20 2009 005 811 U1 | 9/2010 |
| DE | 20 2012 102 561 U1 | 10/2013 |
| DE | 10 2013 100 801 A1 | 7/2014 |
| EP | 0 158 611 B1 | 7/1990 |
| EP | 0 516 598 B1 | 11/1994 |
| EP | 0 732 779 B1 | 9/1998 |

(Continued)

*Primary Examiner* — Debra M Sullivan
(74) *Attorney, Agent, or Firm* — The Sladkus Law Group

(57) ABSTRACT

The invention relates to a crimping pliers die (1) comprising two die half units (2, 3). The die half units (2, 3) are guided by a guide (51) relatively to each other over the crimping stroke. Crimping surfaces (40, 41) of the die halves (5) are formed by front surfaces of engaging ribs (37). Preferably, the guide (51) comprises a guiding rod (43) formed by an end-sided thickening (42) of a rib (37) and the guide (51) comprises a guiding recess (50) formed by a guiding recess section (45) which connects two ribs (37) to each other. The crimping pliers die (1) can be used for crimping pliers which can e. g. be used for crimping wire end sleeves.

14 Claims, 9 Drawing Sheets

(56) References Cited

FOREIGN PATENT DOCUMENTS

| | | | |
|---|---|---|---|
| EP | 2 115 829 | B1 | 7/2015 |
| EP | 3 012 923 | B1 | 4/2016 |
| EP | 3 012 924 | A1 | 4/2016 |
| EP | 2 905 848 | B1 | 9/2016 |
| EP | 3 179 580 | A1 | 6/2017 |
| EP | 3 012 924 | B1 | 12/2017 |
| EP | 2 949 014 | B1 | 10/2020 |
| WO | 2019/105703 | A1 | 6/2019 |
| WO | 2019/105704 | A1 | 6/2019 |

* cited by examiner

CRIMPING PLIERS DIE AND CRIMPING PLIERS

CROSS REFERENCE TO RELATED APPLICATIONS

This application claims priority to co-pending European Patent Application No. EP 20 171 789.9 filed Apr. 28, 2020.

FIELD OF THE INVENTION

The present invention relates to a crimping pliers die designated for being used in crimping pliers. The crimping pliers die comprises two die half units. Die halves of the die half units comprise crimping surfaces which define a die accommodation. It is possible to insert a workpiece (as e.g. a wire end sleeve (with or without an isolation collar) with the wire arranged therein) into the die accommodation. Then, the workpiece is crimped over a crimping stroke between the crimping halves of the dies by moving the die halves and with the die halves also the crimping surfaces along a crimping axis towards each other. The die half units each comprise a rotational bearing element. The rotational bearing element is a component of a rotational bearing (formed by the crimping pliers die or together with the pliers jaws of the crimping pliers). The rotational bearing allows a rotation of the die halves about a rotational axis having an orientation coaxial or parallel to the crimping axis. This rotation can be used for allowing a change of the position of the die accommodation relative to the pliers jaws so that it is possible to insert the workpiece into the die accommodation and/or to crimp the workpiece by the crimping pliers die in different orientations of the die accommodation (and so of the workpiece) relative to the pliers jaws (relative to the pliers head, relative to a base body and/or relative to the hand levers of the crimping pliers).

BACKGROUND OF THE INVENTION

The publication EP 0 516 598 B1 discloses a crimping pliers die comprising two die half units. The die half units are each supported for being pivoted about pivot axes arranged vertically to a pivot plane of the pliers jaws on the pliers jaws by a swivel pin in bearing eyes of the pliers jaws of the crimping pliers. The die half units each comprise a guiding rod on one side of a die as well as a guiding recess embodied as a guiding bore on the other side of the die half. The guiding rod of one die half unit is then guided for being displaced along the crimping axis in the associated guiding bore of the other die half unit. In this way a securing against rotation is provided by which the two die half units are guided relatively to each other over the crimping stroke. In a given relative orientation of the two die half units defined by the securing against rotation it is possible to commonly rotate the two die half units about a rotational axis which is arranged coaxially to the crimping axis. Dependent on the rotational angle of the die half units about this rotational axis it is then possible to bring the orientation of the longitudinal axis of the die accommodation delimited by the two die halves into a first rotational position (wherein the die accommodation has an orientation in longitudinal direction of the crimping pliers and extends in the pivoting plane of the pliers jaws) as well as into a second rotational position (wherein the die accommodation has an orientation vertical to the pivot plane of the pliers jaws). In the first rotational position it is possible to insert a workpiece from the front into the crimping pliers and into the die accommodation.

Instead, in the second rotational position it is possible to insert the workpiece in lateral direction into the die accommodation.

Also the publications WO 2019/105704 A1 (corresponding to US 2020/0251869 A1) and WO 2019/105703 A1 disclose generic crimping pliers dies which are held on pliers jaws of crimping pliers by a rotational bearing for being rotated about a rotational axis having an orientation parallel to the crimping axis.

Further prior art is know from EP 3 012 924 A1 (corresponding to EP 3 012 924 B1) and DE 10 2007 005 176 A1 (corresponding to EP 2 115 829 B1).

SUMMARY OF THE INVENTION

The present invention proposes a crimping pliers die which is in particular improved with respect to the operation and/or the provision of the desired crimping result.

The present invention relates to a crimping pliers die comprising two die half units. The die half units comprise die halves which can be moved relatively to each other over a crimping stroke along a crimping axis. The die half units each comprise a rotational bearing element which allows a rotation of the die halves about a rotational axis. The rotational axis has an orientation coaxial or parallel to the crimping axis. The rotational bearing element might e.g. be a bearing stud or protrusion of the die half unit which has an orientation coaxial to the axis of rotation and which is accommodated in a bearing eye of the pliers jaw or of a bearing body supported on the pliers jaw of the crimping pliers. It is also possible that the rotational bearing element of the die half unit is a bearing eye wherein a bearing stud or protrusion of the pliers jaw or a holding body of the pliers jaw extends. In this case the rotational bearing (which provides the axis of rotation and which allows the rotation of the die halves) is built in common by the crimping pliers die and further components of the crimping pliers. However, it is also possible that the rotational bearing providing the rotation of the die halves about the axis of rotation is a component of the die half units so that then no additional measures have to be taken for connecting the crimping pliers die to the pliers jaws for allowing the rotation about the axis of rotation.

The invention proposes that a stop body (in particular a stop disc) is arranged on the crimping pliers die. The stop body is here supported for being rotated about a stop body rotational axis by a stop body rotational bearing on one of the two die halves. The stop body rotational axis has an orientation parallel to an accommodation axis of a die accommodation formed by the die half units. The stop body comprises at least two insertion stops which are arranged remote from each other along the dispersed in circumferential direction about the stop body rotational axis or arranged with a distance along the circumference of the stop body rotational axis. Preferably, the distance of the insertion stops from the stop body rotational axis corresponds to the distance of the die accommodation from the stop body rotational axis. Within the frame of the invention the insertion stops can be evenly or unevenly distributed along the circumference of the stop body rotational axis. The insertion stops might serve for providing an insertion support when inserting the workpiece into the die accommodation. Preferably, one insertion stop defines the depth of insertion of the workpiece along the longitudinal axis of the workpiece into the die accommodation. The different insertion stops might be adapted to different workpieces that are crimped by the crimping pliers die (e.g. different dimensions and/or axial lengths of wire end sleeves). Accordingly, the different insertion stops might define different insertion depths for the depth of insertion of the workpiece into the die accommodation. By means of a rotation of the insertion body about the stop body rotational axis it is possible to activate the different insertion stops. Accordingly, by a rotation of the stop body the user is able to adapt the crimping pliers die (namely by adapting the insertion depth) to different workpieces (in particular different types or sizes of wire end sleeves). According to the invention the respective insertion stop can be used independent on the chosen and used relative rotational angle of the die accommodation by the user.

It is possible that the rotational position of the stop body is secured by friction or in any other way. For one embodiment of the crimping pliers die a stop body latching device or stop body locking device is provided. The stop body latching device or stop body locking device latches or locks the stop body in predefined stop body rotational angles of the stop body relative to the die half so that it is possible to secure the operational position of the stop body.

There are a lot of options for the design of the stop body latching device or stop body locking device. For one proposal of the invention, the stop body and the die half each comprise stop body guiding surfaces. The stop body guiding surfaces have an orientation vertical to the stop body rotational axis. During the rotation about the stop body rotational axis, the stop body and the die half are guided relatively to each other on the stop body guiding surfaces. In this case one stop body guiding surface comprises a recess. A stop body latching element or stop body locking element biased by a spring is arranged in this recess. For providing the latching or locking effect, in the predefined relative stop body rotational angles wherein an insertion stop associated with the stop body rotational angle is arranged at the desired position relative to the die accommodation the stop body latching element or stop body locking element is at least partially arranged in the stop body latching recess or stop body locking recess. In this way it is possible to secure an operating position of the stop body set by the user.

There are a lot of options for the way of designing the stop body rotational bearing. For one possible embodiment it is proposed that the die half comprises a stop body bearing protrusion. The stop body bearing protrusion extends through a stop body rotational bearing bore of the stop body. On the side of the stop body facing away from the die half the stop body bearing protrusion comprises an axial securing element (which might be a securing ring accommodated in a annular groove of the stop body bearing protrusion). For this embodiment it is possible that the stop body is axially trapped between a base body of the die half and the axial securing element. In this way a securing against an exit of the stop body bearing protrusion from the stop body is provided.

The invention also proposes that the two die half units (here in particular the die halves) might be guided relatively to each other by a guide or guidance over the crimping stroke. By means of this guide it can e.g. be provided that the two die halves are always pivoted commonly about the rotational axis having an orientation coaxial or parallel to the crimping axis. On the other hand, by means of this guide, it is possible to provide a relative guidance of the die halves so that in the end the precision of the crimping result is increased. The guide might here e.g. be embodied as disclosed in the prior art mentioned above.

For one particular proposal of the invention the guide comprises at least one guiding rod held by one die half unit. This guiding rod is guided in a guiding recess of the other die half unit. The guiding rod and the guiding recess might have any cross section as long as the cross sections provide a longitudinal guidance over the crimping stroke. Preferably, the guiding rod and the guiding recess comprise an (at least partially) circular guiding cross section.

It is also possible that two guiding rods are provided which are then guided in corresponding guiding recesses. Here, the two guiding rods might be provided on one of the die half units whereas then two guiding recesses are arranged in the other die half unit. However, it is also possible that each of the die halves comprises a guiding rod and a guiding recess.

In this respect the inventive crimping pliers die might e.g. correspond to a crimping pliers die as known from the publication EP 0 516 598 B1. However, according to EP 0 516 598 B1 the die halves have a massive design with crimping surfaces having a large surface area. According to EP 0 516 598 B1 the crimping surfaces have a continuous design. A continuous crimping surface of one die half of EP 0 516 598 B1 has a convex design whereas the crimping surface of the other die half according to EP 0 516 598 B1 has a concave design. Instead, the invention proposes to use a different type of die halves (namely die halves each comprising a plurality of ribs) in a die half unit having a guide which might correspond to the guide disclosed in EP 0 516 598 B1. The ribs of the die halves engage each other with an extension of the engaging portion changing over the crimping stroke. In this case the crimping surfaces of the die halves are formed by the front faces of the ribs. Accordingly, this type of dies does not generate a continuous pressing of the workpiece between the die halves over a large surface area. Instead, the crimping is provided by a plurality of subsections being arranged spaced from each other at the front faces of the spaced ribs of the die halves. The use of die halves of this type has shown to be advantageous in particular for a special type of workpieces, in particular for crimping wire end sleeves to a cable. Die halves with engaging ribs of this type are e.g. known from a tool of the applicant with the label “CS 10-AE 22” or from one of the publications EP 3 179 580 A1, U.S. Pat. Nos. 4,283,933 A and 6,151,950 A. It has surprisingly shown that the use of known die halves of this type with engaging ribs can also be used for a crimping pliers die with a guide of the die half units as e.g. known from EP 0 516 598 B1.

According to EP 0 516 598 B1 the die halves comprise a base plate from which one die extends towards the other die half. According to EP 0 516 598 B1 the die plate comprises a guiding recess on one side of the die whereas according to EP 0 516 598 B1 the guiding rod is fixed to the base plate on the other side of the die contour body. Generally, within the frame of the invention also a construction of this type can be used for the inventive crimping pliers die wherein on the one hand the ribs (or also a massive die comprising no ribs) are held on the base plate and on the other hand the guiding rod is held remote from the ribs or from the die on the base plate and the guiding recess extends through the base plate. However, for a particular proposal of the invention the guiding rod is formed by a thickened end region of at least one rib of a die half. This connection of the guiding rod with at least one rib of the die half might be used alternatively or cumulatively to the connection of the guiding rod to a base plate. The formation of the guiding rod by the thickened end region of at least one rib leads to a notably compact design. It is possible that the manufacturing process is simplified because it is possible to manufacture the guiding rod as an integral component of the at least one rib. It is also possible that the assembly effort is reduced and the diversity of the components of the crimping pliers die is reduced. At least over a part of the extension of the rib or ribs the guiding rod is connected along the crimping axis to the plate-shaped base body of the rib which might lead to a notably stiff support. Accordingly, the guiding rod is not held on the base plate only in a freely extruding way so that it is possible that the precision of the guide is increased and the mechanical stiffness of the guide is increased.

It is alternatively or cumulatively possible that the guiding recess is formed by a guiding recess section or connecting section which is arranged in the end region of at least one rib and which preferably connects the end regions of two ribs of one die half. In this case the guiding recess section forms a guiding surface having at least partially the shape of a segment of a cylinder. The guiding recess section comprises a guiding recess which is limited by the guiding surface. The guiding recess has a cross section with an open edge (which is open towards the interspace between the two ribs). The guiding recess section comprises a guiding surface having the shape of a segment of a cylinder. The guiding rod is guided on the guiding surface. Here, the segment of the cylinder comprises an angle of more than 180° (preferably more than 200°, more than 220°, more than 240°, more than 260°, more than 280°). This might lead to the result that by the guiding surface having the shape of a segment of a cylinder a support is provided in directions being orthogonal to each other in a plane having an orientation transvers to the guiding axis. By connecting the guiding recess section to two ribs it is possible to provide a very stiff support.

The guiding halves (and also further components of the crimping pliers die) can be manufactured in any manufacturing process (e.g. by means of casting, an injection molding process and/or a material removing or milling manufacturing process). For a particular proposal of the invention the die halves are powder spraying parts. Powder spraying (which can also be denoted as power injection molding or PIM-process or metal injection molding or MIM-process) is a primary forming process for manufacturing metallic components. During powder spraying a fine metal powder is mixed with an organic binding material and brought into shape by an injection molding machine. Subsequently, the organic binding material is removed and the component is sintered at high temperatures in an oven. In some cases, any post-processing can be used subsequent to the manufacturing in the injection molding process. It is shown that powder spraying, PIM or MIM is advantageous for manufacturing the die halves and for manufacturing the complex geometry with the plurality of ribs arranged parallel to each other and/or with the guide.

For another proposal of the invention at least one die half unit comprises a bearing part. By use of the bearing part it is possible to assemble the die half unit to an adjacent pliers jaw with a pivoting degree of freedom. Here, the assembly provides a pivot axis having an orientation vertical to a pivot plane of one pliers jaw. By using the degree of freedom defined by the pivot axes of the two die half units it is possible to choose an orientation of the die half units relative to each other on the pliers jaw in a way such that the guiding rod has an orientation coaxial to the guiding recess. Accordingly, it is possible to slide the die half units into each other on the one hand with the entry of the guiding rods into the guiding recesses and (if applicable) on the other hand with the establishment of the engagement of the ribs.

Generally, the bearing part might be designed as a swivel pin according to EP 0 516 598 B1, the swivel pin being accommodated in a bearing eye of a pliers jaw. A notably simple assembly with a reduction of the number of the required components results when for another proposal of the invention the bearing part comprises a bearing body. In this case, the bearing body might comprise a guiding surface having a guiding diameter and having the shape of a segment of a cylinder. Furthermore, the guiding body comprises an insertion surface. In the region of the insertion surface the extension of the bearing body is smaller than the guiding diameter. If the bearing eye of the pliers jaw has a cross section having an open edge and it is then required to insert the bearing body though the edge opening the bearing body of the bearing part is rotated to an orientation such that it is possible to insert the bearing body with the smaller extension in the region of the insertion surface through the edge opening into the bearing eye. If the bearing body is then arranged in the bearing eye, the bearing body is rotated such that the larger guiding diameter of the guiding surface having the shape of a segment of a cylinder comes into effect so that the bearing body is no longer able to exit through the edge opening. For this purpose the edge opening of the bearing eye of the pliers jaw has an extension which is smaller than the guiding diameter, but larger than the extension of the bearing body in the region of the insertion surface.

For one embodiment of the crimping pliers die the die half unit comprises a holding body which might also form the bearing part or which might support the bearing part. For this embodiment the die half is supported by a rotational bearing on the holding body. Here, the rotational bearing has an axis of rotation having an orientation parallel to the guiding axis of the guiding rod and/or of the guiding recess. Accordingly, the axis of rotation has an orientation parallel or coaxial to the guiding axis of the guide. The axis of rotation might here correspond to the crimping axis of the crimping pliers. By the rotational bearing it is possible to provide that the die half units can be rotated in common relatively to the pliers jaws in a way such that it is possible to insert the workpiece in different directions into a die accommodation. It is e.g. possible to insert the workpiece in frontal direction or in lateral direction.

It is also possible that a latching or locking device is interposed between the holding body and the die half. The latching device or locking device is then used for latching or locking the die half in predefined relative rotational angles between the holding body and the die half about the axis of rotation. Accordingly, the latching device or locking device secures an operating position of the crimping pliers die. Here, for moving away from a latched position the user applies sufficiently high rotational forces about the axis of rotation. Instead, it is not possible to induce that a locked position is left by the pure application of a rotational moment about the axis of rotation. Instead, for leaving a locked position it is required to additionally manually actuate an unlocking element.

Here, it is possible that the holding body and the die surface comprise guiding surfaces. These guiding surfaces have an orientation vertical to the axis of rotation. The holding body and the die half are guided relative to each other during the rotation about the axis of rotation by the guiding surfaces. On the other hand, the guiding surfaces can also be used for supporting the crimping force between the holding body and the die half. In this case, one of the guiding surfaces comprises a recess. A latching or locking element is arranged in the recess. The latching or locking element is biased by a pre-tensioned spring. In this case, the other guiding surface comprises a latching or locking recess. In predefined relative angles of rotation of the die half relative to the holding body then the latching or locking element is (at least partially) arranged in an associated latching or locking recess so that the latching or locking effect is provided. In this way it is possible to reliably provide a latching or locking by use of a simple construction.

Generally, the rotational bearing used for supporting the holding body relative to the die half for being rotated might have any design. For one proposal of the invention for providing the rotational bearing the holding body comprises a bearing protrusion. The bearing protrusion has an orientation parallel to the guiding axis of the guiding rod and/or of the guiding recess of the die half unit. The bearing protrusion extends through a rotational bearing bore of the die half and comprises an axial securing element. A material section of the die half can then be trapped between a base body or a base plate of the holding body and the axial securing element so that an axial exit of the bearing protrusion from the rotational bearing bore of the die half is not possible. The die half might e.g. have a lateral slit or slot between the front face facing towards the holding body and the crimping surfaces. The end region of the bearing protrusion might then comprise a annular groove. When the bearing protrusion has been inserted into the rotational bearing bore of the die half it is then possible that the end-sided annular groove of the bearing protrusion is accessible via the lateral slit or slot and an axial securing element embodied as a securing ring can be inserted through the lateral slit or slot and might then snap onto the annular groove.

It is possible that in the crimping pliers die the die half units have different designs. The differences might on the one hand relate to the die contours and the design of the crimping surfaces. However, it is also possible that the guide or other components or design criteria of the die half units differ from each other. In order to mention only one example (which is not intended to limit the invention) one die half unit might comprise both guiding rods whereas this die half unit does not have any guiding recess. In this case, the other die half unit only comprises guiding recesses. However, for one particular embodiment of the invention the two die half units, the two bearing parts and/or the two die halves have an identical design which leads to a reduction of the diversity of the components, a reduction of the manufacturing costs, an improved exchangeability and a reduction of the effort for storage of parts.

Another solution of the object of the invention is given by crimping pliers wherein die half units of a crimping pliers die as described before are held by pliers jaws of the crimping pliers.

Generally, the crimping pliers die can be used with crimping pliers of any design, e.g. with respect to

- the actuation cinematics,
- the provision of an electronic constructional unit,
- the integration of sensors for sensing a crimping displacement and/or a crimping force,
- a force-blocking unit,
- options for exchanging the crimping pliers die,
- a ratchet driving transmission,
- a provision of different crimping steps with a subdivision of the whole crimping stroke into at least two crimping stroke parts with associated closing movements of the hand levers with subsequent reopening and closure of the hand levers in the next crimping stroke part.

For one embodiment of the invention in the crimping pliers at least one die half unit is supported by a force-displacement compensating element. A force-displacement compensating element of this type aims for providing an elasticity in the path from the actuation forces applied by the user onto the hand levers of the crimping pliers to the pliers jaws and to the die half units. This elasticity can be used for increasing the variety of the geometries of the workpiece that can be crimped by the crimping pliers and the same die half units. If generally the crimping pliers are dimensioned for crimping a workpiece with a comparatively small geometry, the crimping of a workpiece having a larger geometry with the crimping pliers and the same die half units leads to the result that the required crimping forces are already generated before the hand levers have completely been closured. Accordingly, the closed position of the hand levers would not be reached without the use of a force-displacement compensating element. In the case that in the crimping pliers also a forced locking unit is used, the arrival in the closed position is necessarily required for being able to reopen the crimping pliers. When using a force-displacement compensating element the generation of further increased actuation forces on the crimping pliers leads to an elastic deformation of the force-displacement compensating element in a way such that the complete closure of the hand levers is possible. Accordingly, the forced locking unit also permits a reopening of the hand levers. For possible designs of force-displacement compensating elements of this type reference is e.g. made to force-displacement compensating elements as known from the publications EP 3 012 923 B1, EP 0 732 779 B1, EP 0 158 611 B1, DE 31 09 289 C2 (corresponding to U.S. Pat. No. 4,381,661 A), DE 20 2012 102 561 U1 (corresponding to US 2015/0180190 A1), DE 20 2009 005 811 U1, DE 10 2013 100 801 A1 (corresponding to EP 2 949 014 B1) and EP 2 905 848 B1.

Advantageous developments of the invention result from the claims, the description and the drawings.

The advantages of features and of combinations of a plurality of features mentioned at the beginning of the description only serve as examples and may be used alternatively or cumulatively without the necessity of embodiments according to the invention having to obtain these advantages.

The following applies with respect to the disclosure—not the scope of protection—of the original application and the patent: Further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims which, however, does not apply to the independent claims of the granted patent.

The number of the features mentioned in the claims and in the description is to be understood to cover this exact number and a greater number than the mentioned number without having to explicitly use the adverb "at least". For example, if an element is mentioned, this is to be understood such that there is exactly one element or there are two elements or more elements. Additional features may be added to these features, or these features may be the only features of the respective product.

The reference signs contained in the claims are not limiting the extent of the matter protected by the claims. Their sole function is to make the claims easier to understand.

BRIEF DESCRIPTION OF THE DRAWINGS

In the following, the invention is further explained and described with respect to preferred exemplary embodiments illustrated in the drawings.

DETAILED DESCRIPTION

In the present description of the figures partly the same reference number is used for components which are identical or similar with respect to their geometry and/or function. In this case the components are distinguished from each other by an additional letter a, b, . . . . In this case, reference is made to these components with or without the additional letter which then relates to one single component, a plurality of these components or all of these components.

Figure 1:
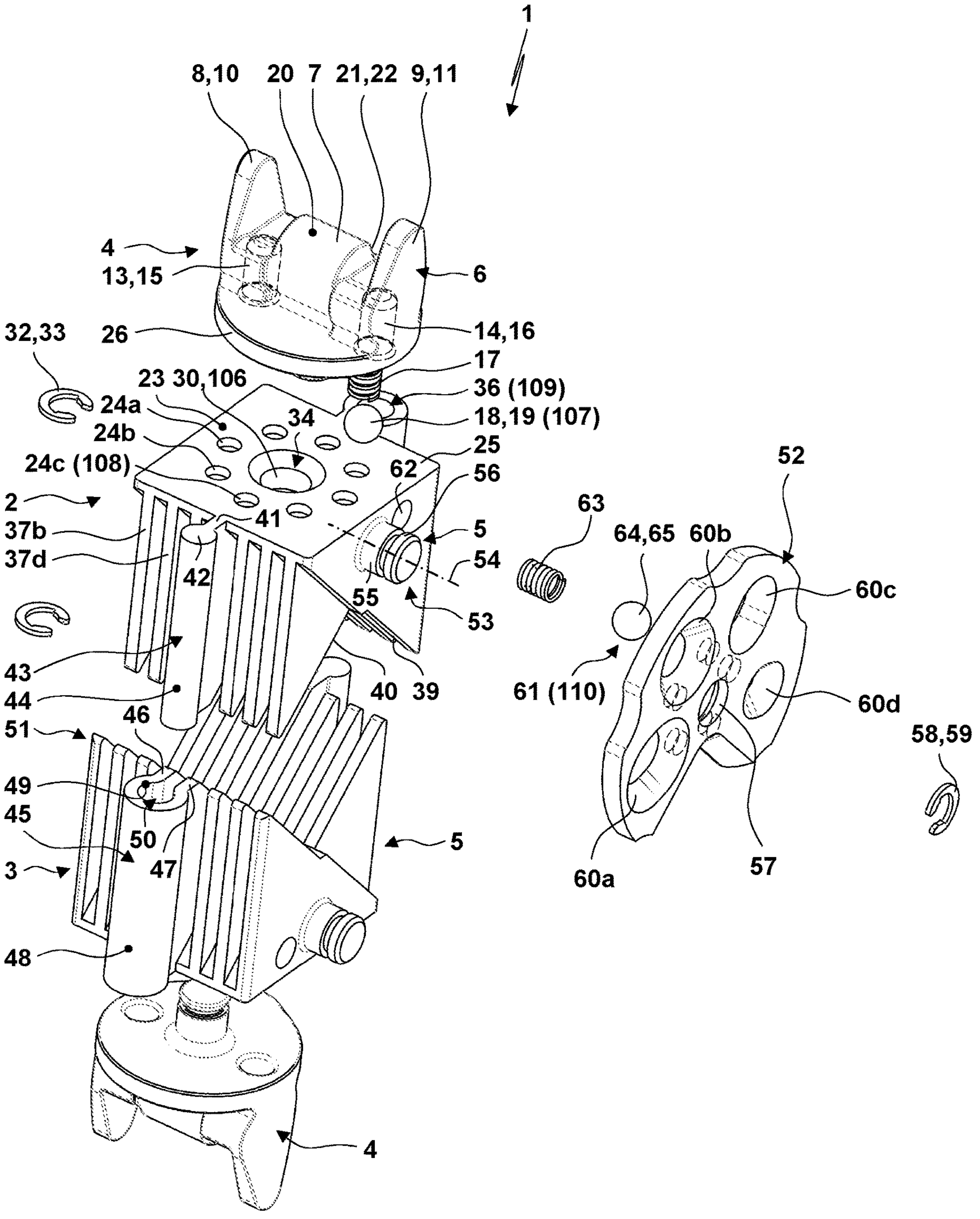
FIG. 1 shows a crimping pliers die in a three-dimensional exploded view.

FIG. 1 shows in a three-dimensional exploded view a crimping pliers die 1. The crimping pliers die 1 comprises an upper die half unit 2 and a lower die half unit 3. The upper die half unit 2 and the lower die half unit 3 have identical designs so that for the following description primarily reference is made to the die half unit 2 (the corresponding then also applies for the other die half unit 3).

The die half unit 2 comprises a holding body 4 and a die half 5.

The holding body comprises a bearing part 6 with a bearing body 7 and with stops 8, 9. Here, the stops 8, 9 are embodied as arms 10, 11 being arranged on both sides of the bearing body 7. The bearing part 6 with the bearing body 7 and the arms 10, 11 is arranged on the side of the holding body 4 facing away from the die half 5.

On the side facing towards the die half 5 the holding body 4 comprises a guiding surface 12. At least one recess 13, 14 (here embodied as blind bore 15, 16) extends from the guiding surface 12. A spring 17 and via the spring 17 a latching element 18 (here a latching sphere 19; instead of a latching element also a locking element 107 might be used) is supported on the bottom of the recess 14. Dependent on the assembly situation the spring 17 with the latching element 18 might also be arranged in the other recess 13 or a spring with associated latching element can be arranged in both recesses 13, 14.

The bearing body 7 comprises a guiding surface 20 having the shape of a segment of a cylinder and an insertion surface 21 which is in particular embodied as a flattening 22.

On the side facing towards the holding body 5 the die half 5 comprises a guiding surface 23. In the assembled state the guiding surface 23 of the die half 5 contacts the guiding surface 12 of the holding body 4. Via the guiding surfaces 12, 23 the crimping force is also supported between the die half 5 and the holding body 4. On the other hand the guiding surfaces 12, 23 provide a guidance during the rotation of the die half 5 relative to the holding body 4 which will be explained in the following. The guiding surfaces 12, 23 define the desired orientation of the die half 5 relative to the holding body (preferably in the direction of the crimping axis 105) independent on this relative rotation.

Latching recesses 24*a*, 24*b* (or instead differently shaped locking recesses 108*a*, 108*b*, . . . ) extend from the guiding surface 23 of the die half 5. The latching recesses 24 are embodied as blind bores or through bores of a base plate 25 of the die half 5. For latching a relative rotational angle between the holding body 4 and the die half 5 the latching element 18 is biased by the spring 17 out of the holding body 4 into the latching recess 24 and the latching element 18 (at least partially) enters into the latching recess 24. In this way the relative rotational angle between the die half 5 and the holding body 4 is secured.

A bearing protrusion 27 extends from the base plate 26 of the holding body 4. The bearing protrusion 27 is here embodied as journal and comprises a annular groove 29 in the end region facing away from the base plate 26. In the assembled state the bearing protrusion 27 is accommodated in a rotational bearing bore 30 of the die half 5. In the assembled state the bearing protrusion 27 extends up to a lateral slit or slot 31 of the die half 5. Due to the slit or slot 31 the annular groove 29 of the bearing protrusion 27 is accessible from the outside. Accordingly, it is possible to connect an axial securing element 30 (here a securing ring 30) through the lateral slit or slot 31 to the bearing protrusion 27. Here, in the case that the securing element 32 is embodied as securing ring 33 the securing ring 33 snaps into the annular groove 29. In this way the bearing protrusion 27 of the holding body 4 is secured against re-exiting from the die half 5.

The accommodation of the bearing protrusion 27 of the holding body 4 in the rotational bearing bore 30 provides a rotational bearing 34. The rotational bearing 34 allows a rotation of the die half 5 relative to the holding body 4 about an axis of rotation 35 having an orientation parallel or coaxial to the crimping axis 105. In the present application the axis of rotation 35 provides a first rotational degree of freedom for a stop body 52. For different relative rotational angles between the holding body 4 and the die half 5 about the axis 35 of rotation a securing can be provided by the entry of the latching element 19 into one of the latching recesses 24*a*, 24*b*, which establishes a latching device 36 (or for a different design a locking device 109).

The die half 5 comprises a plurality of plate-shaped ribs 37*a*, 37*b*, . . . which are arranged parallel to each other with the same distances from each other. The ribs 37 extend in a direction vertical to the base plate 25 of the die half 5. The ribs 37 extend parallel to the rotational axis 5 and to the crimping axis 105. The distance of the ribs 37*a*, 37*b*, . . . is slightly larger than the thickness of the ribs 37*a*, 37*b*, . . . . All of the ribs 37*a*, 37*b*, . . . have the same thicknesses. It is possible to slide the ribs 37*a*, 37*b*, . . . of the die halves 5 of the two die half units 2, 3 into each other so that the ribs 37 of one die half 5 of one die half unit 2 are arranged in the interspaces between the ribs 37 of the die half 5 of the other die half unit 3. Preferably, the ribs 37 of the die halves 5 of the die half units 2, 3 contact each other closely but with a low friction so that here a transition fit or clearance fit can be used. Accordingly, the ribs 37 can be moved relatively to each other in the direction of the crimping axis 105 and of the rotational axis 35. In a direction vertical to the extensional plane of the ribs 37 there is at the most a small play for a relative movement of the holding body 4 of the die half units 2, 3.

Figure 2:
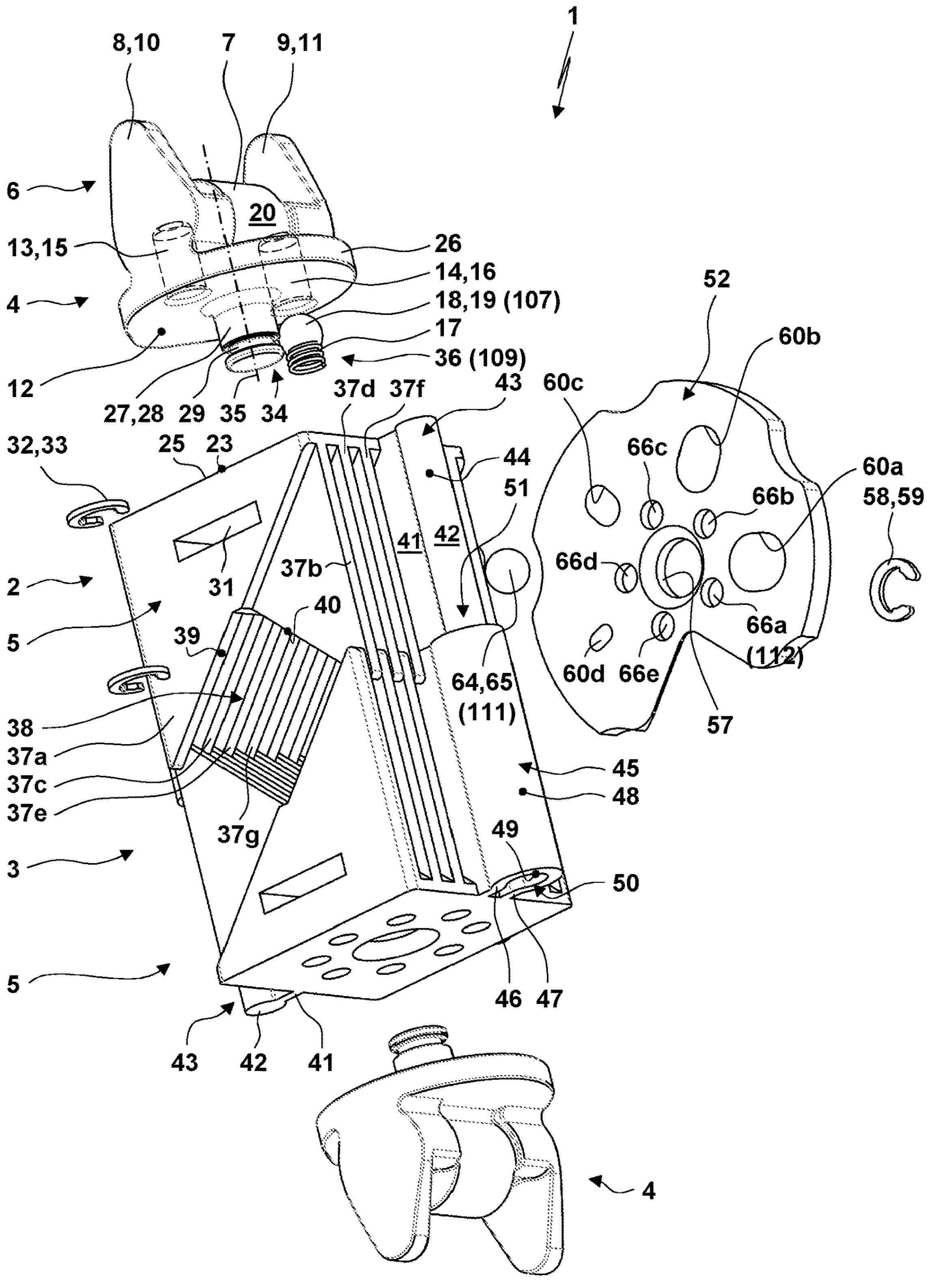
FIG. 2 shows the crimping pliers die of FIG. 1 in a three-dimensional exploded view from another viewing direction.
Figure 3:
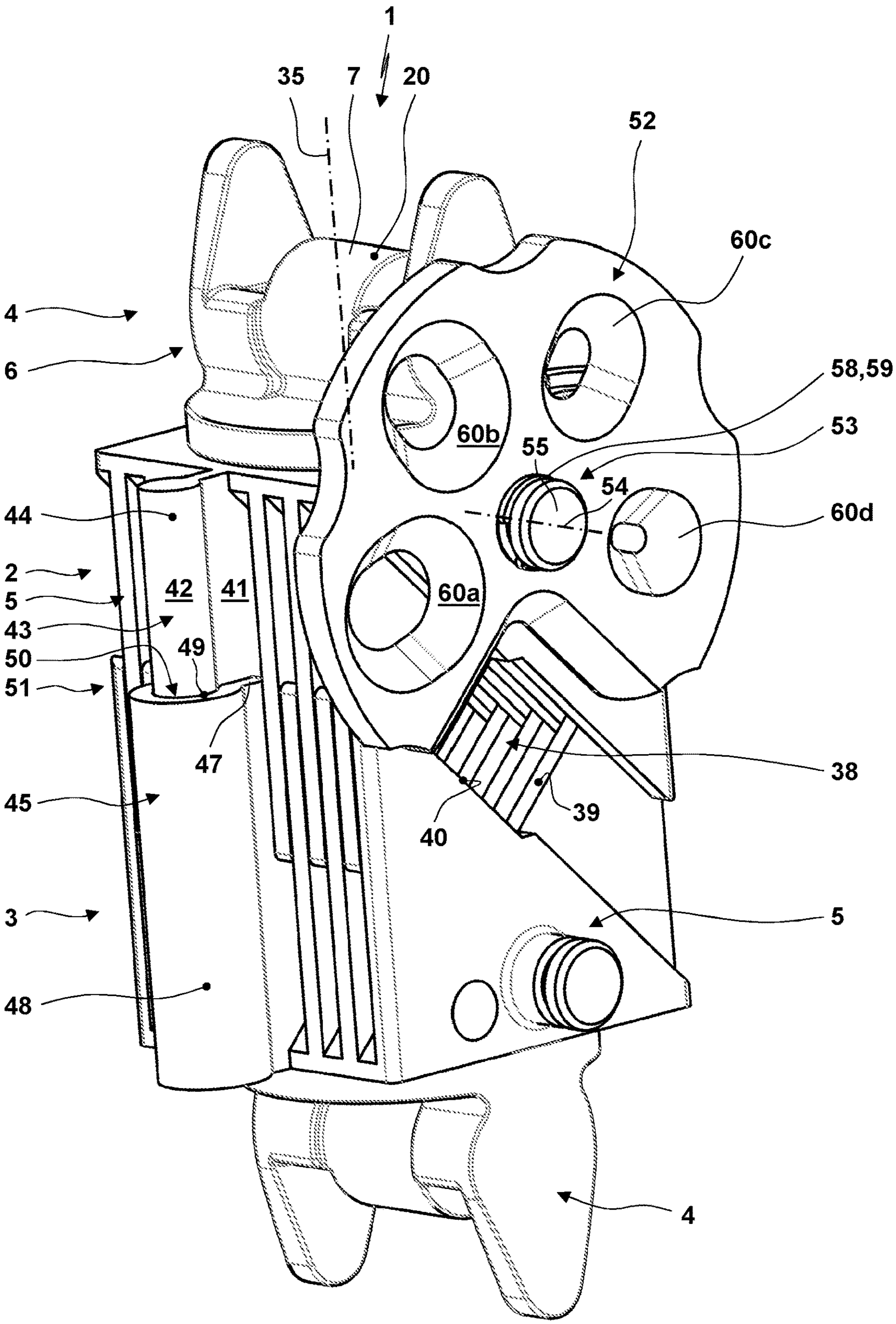
FIG. 3 shows the assembled crimping pliers die of FIGS. 1 and 2 in a three-dimensional view.

When viewing in the direction of a die accommodation 38 formed by the die halves 5 the ribs 37 generally have the shape of a right-angled triangle. Here, the legs limiting the right angle of the triangle are alternatingly connected to the base plate 25 of the die half. Accordingly, crimping surfaces 39, 40 formed by adjacent ribs form a kind of V or a right angle. The crimping surfaces 39, 40 of the two die halves 5 of the die half units 2, 3 delimit the square, rectangular or rhombic cross-sectional contour of the die accommodation 38 (as can be seen in FIG. 2). Here, by a relative movement of the die half units 2, 3 in the direction of the crimping axis 105 the size of the die accommodation 38 varies over the crimping stroke. However, the square, rectangular or rhombic geometry will still be upheld.

The dies comprise (except the side with the crimping surfaces 39, 40 for the formation of the die accommodation 38) a generally rectangular block-shaped outer geometry where the outer geometry is open in the region of the interspaces between the ribs 37.

One (preferably central) rib 37 extends beyond the rectangular block-shaped outer geometry with a strip-like or plate-like extension section 41 and an end-sided thickening 42. The thickening 42 forms a guiding rod 43. The guiding rod 43 is connected to the rib 37 by the extension section 41 over the whole extension of the associated rib 37 in the direction of the crimping axis 105. The extension section 41 and the thickening 42 comprise a cross section which does not vary in the direction of the crimping axis 105 and which comprises two guiding surfaces arranged parallel to each other in the region of the extension section 41. In the region of the thickening 42 the cross section has the shape of a segment of a circle so that the guiding rod 43 forms a guiding surface 44 having the shape of a segment of a cylinder.

Two ribs 37 which directly contact the rib 37 which forms the guiding rod 43 (or which are arranged adjacent to the same) on the opposite side form a connecting region or guiding recess section 45 being arranged outside from the rectangular block-shaped geometry. Here, the guiding recess section 45 comprises two plate-like or strip-like extension sections 46, 47 as well as a guiding recess portion 48. The extension sections 46, 47 form guiding surfaces being arranged parallel to each other whereas the guiding recess portion in the interior forms a guiding surface 49 having the shape of a segment of a cylinder. The guiding surface 49 forms a guiding recess 50 or guiding bore (which has an open edge). The guiding recess section 45 extends over the whole extension of the associated rib 37 along the crimping axis 105 and comprises a constant cross section over the whole extension.

When the crimping pliers die 1 is assembled, for the formation of a guide 51 a guiding rod 43 of the die half 5 of one die half unit 2 is accommodated in a guiding recess 50 of a die half 5 of the other die half unit 3 (and vice versa). The guide 51 provides that

- the die halves 5 of the two die half units 2, 3 can be commonly rotated about the rotational axis 35,
- a displacement of the die halves 5 of the die half units 2, 3 transvers to the crimping axis 105 and in the main extensional plane of the ribs 37 is limited or blocked and/or
- a support of the die halves 5 of the die half units 2, 3 is provided in a direction vertical to the main extensional plane of the ribs 37.

It is optionally possible that at least one die half 5 of the crimping pliers die 1 comprises a stop body 52. The stop body 52 (which is preferably a stop disc) is supported for being rotated by a stop body rotational bearing 53 on a base body or a rib 37 of the die half 5. The stop body rotational bearing 53 comprises a stop body rotational axis 54 having an orientation vertical to the main extensional plane of the ribs 37. The stop body rotational bearing 53 provides a second rotational degree of freedom for the stop body 52. For the shown embodiment the stop body rotational bearing 53 is formed by a stop body bearing protrusion 55 which extends from the base body or the rib 37 of the die half 5 and which comprises an end-sided stop body annular groove 56. The stop body 52 comprises a stop body rotational bearing bore 57. In the assembled state the stop body bearing protrusion 55 of the die half 5 extends through the stop body rotational bearing bore 57 of the stop body 52. By an axial stop body securing element 58 (here a stop body securing ring 59 which is accommodated in the stop body annular groove 56) the stop body 52 is secured in axial direction on the die half 5. For that purpose the stop body 52 is axially trapped between the stop body securing element 58 and the base body or the rib 37 of the die half 5.

The stop body 52 comprises a plurality of insertion stops 60*a*, 60*b* which are dispersed in circumferential direction about the stop-body rotational axis 54. The insertion stops 60*a*, 60*b* can be moved into an operating position in different relative rotational angles of the stop body 52 relative to the die half 5 about the stop body rotational axis 54. In each of the operation positions the insertion stops 60*a*, 60*b* define an insertion position for inserting a workpiece into the die accommodation 38. Here, it is possible that the insertion stops 60*a*, 60*b* comprise different through recesses as shown which might e.g. have a conical shape on the side facing away from the die half 5 or which might also comprise an elongate cross section differing from a circular cross section with slanted guiding surfaces. It is also possible that the single insertion stops 60 comprise different stop positions with respect to the stop body rotational axis 54 where the different stop positions have the result that for different insertion stops 60 in their operating positions the wire end sleeve can be inserted with different depths into the die accommodation 38. By the different insertion positions it can then e.g. be provided that an inner end region of a wire end sleeve is arranged at a predefined position of the die accommodation 38, in particular in a predefined position relative to the ribs 37.

Optionally, for the shown embodiment the crimping pliers die 1 comprises a stop body latching device 61 (or a stop body locking device 110). The die half 5 comprises a recess 62. A spring 63 (and via the spring 63 a stop body latching element 64, here embodied as latching sphere 65; for a different embodiment also a stop body locking element 111 might be used) is supported on the bottom of the recess 62. On the side facing towards the die half 5 the stop body 52 comprises a plurality of stop body latching recesses 66 (or for a different design stop body locking recesses 112) that are arranged remote from each other along the circumference. The stop body latching element 64 can be latched with the stop body latching recesses 66 in the different operating positions of the insertion stops 60.

Figure 4:
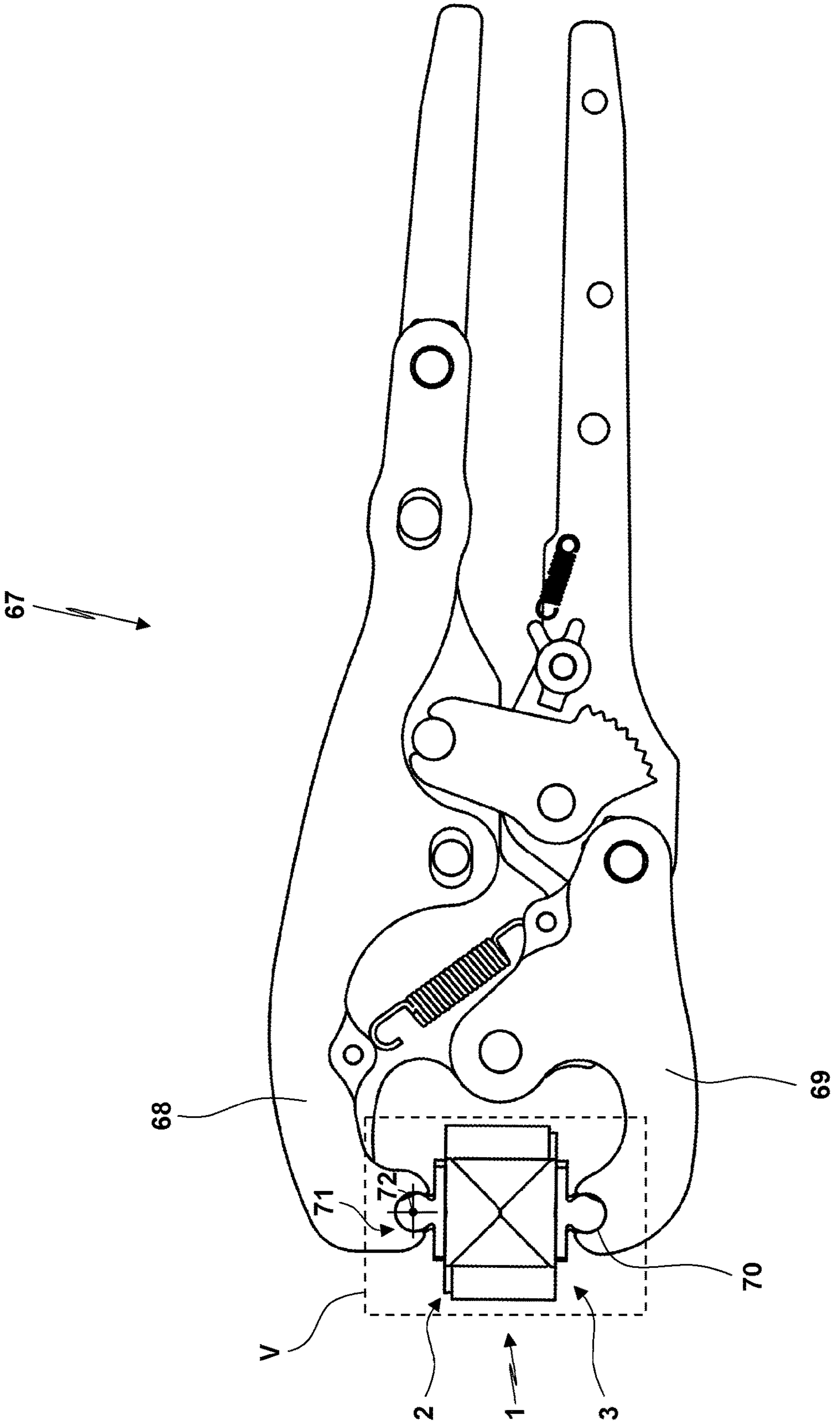
FIG. 4 in a simplified representation shows a subsection through crimping pliers comprising a crimping pliers die of FIGS. 1 to 3.
Figure 5:
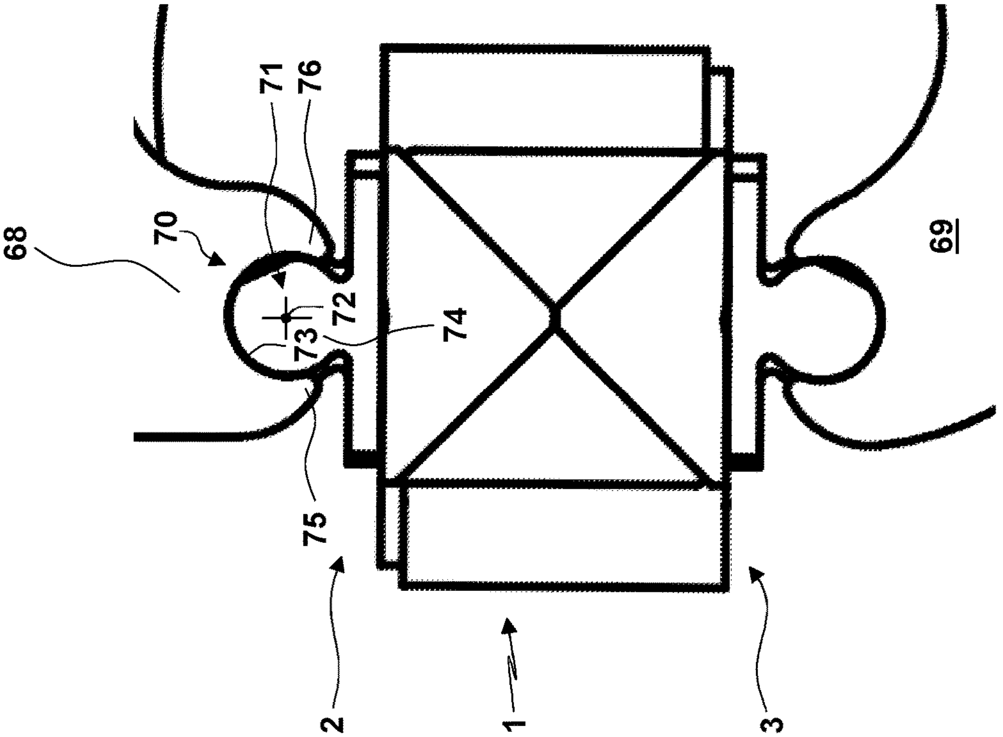
FIG. 5 shows a Detail IV of the crimping pliers of FIG. 4 in the region of the connection of the crimping pliers die to pliers jaws of the crimping pliers.

FIGS. 4 and 5 show crimping pliers 67 (without a front fixed pliers part plate) wherein the die half units 2, 3 of the crimping pliers die 1 are assembled to the pliers jaws 68, 69. Here, FIG. 5 shows a Detail IV of the connection region of the crimping pliers die 1 to the pliers jaws 68, 69. The pliers jaws 68, 69 form a bearing eye 70. Together with the bearing body 7 of the die half units 2, 3 the bearing eye 70 provides a rotational bearing 70 with a rotational axis 72 having an orientation vertical to the drawing plane of FIGS. 4 and 5 and vertical to the pivoting plane of the pliers jaws 68, 69. The bearing eye 70 comprises a bearing bore 70 having an edge opening 74. Due to the edge opening 74 the bearing bore 73 has the shape of a segment of a cylinder, the segment angle being larger than 180° (e.g. in the region of 190° to 240°). Accordingly, the lateral limitations 75, 76 of the edge opening 74 have a distance which is smaller than a guiding diameter of the bearing bore 73. For inserting the bearing body 7 of the bearing part 6 into the bearing eye 70 the bearing body 7 of the die half unit 2 (when the other die half unit 3 is not held thereon) is rotated relatively to the position in FIG. 5 vertical to the pivot plane of the pliers jaws 68, 69 in a way such that the bearing body 7 is able to pass the edge opening 74 with the insertion surface 21 (here the flattening 22). When then the bearing body 7 is arranged in the bearing eye 70, it is possible to pivot the bearing body 7 vertically to the pivoting plane of the pliers jaws 68, 69 in a way such that the insertion surface 21 is arranged within the bearing eye 70. The larger guiding diameter of the guiding surface 20 of the bearing body 7 having the shape of a segment of a cylinder avoids any re-exiting of the bearing body 7 from the bearing eye for this rotational angle and adjacent rotational angles passed during the crimping stroke. Preferably, a rotational angle of the bearing body 7 for which it is possible to insert the bearing body 7 into the bearing eye 70 and for which the bearing body 7 is able to exit from the bearing eye 70 is chosen in a way such that this rotational angle is never approached when the crimping pliers 67 has been assembled with the crimping pliers die 1 held thereon so that this rotational angle is only possible for the at least partially disassembled crimping pliers 67.

Figure 6:
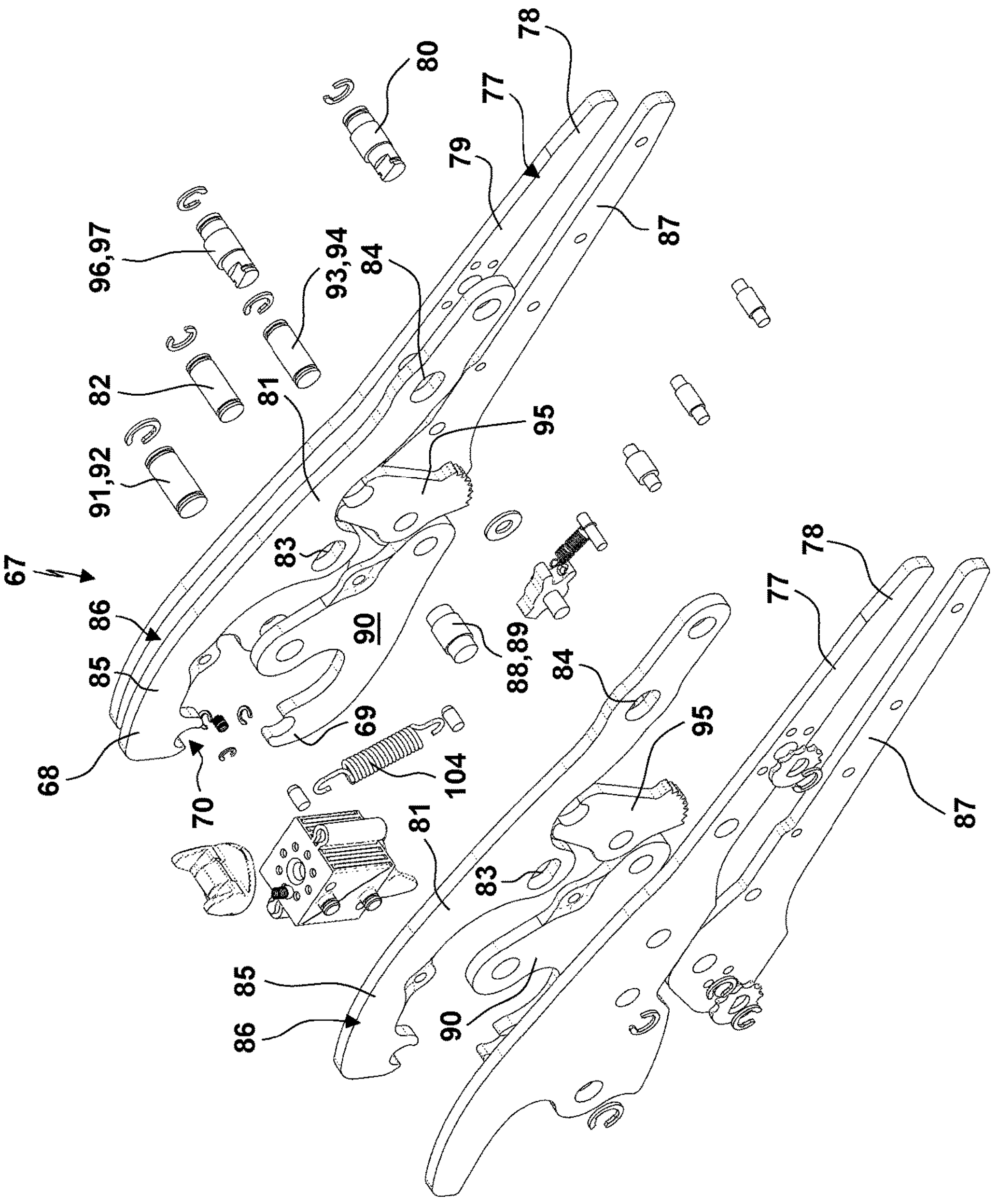
FIG. 6 shows a three-dimensional exploded view of crimping pliers comprising a crimping pliers die of FIGS. 1 to 3.

In an exploded view FIG. 6 shows a possible embodiment of a crimping pliers 67 wherein a crimping pliers die 1 is used. The crimping pliers comprise a fixed pliers part 67. The fixed pliers part 67 comprises a fixed hand lever 68. The fixed pliers part 67 comprises a front and a rear fixed pliers part plate 79. By a swivel pin 80 an elastic pliers jaw 81 is supported for being pivoted on the fixed pliers part 77 (preferably in the region of the hand lever 78). Additionally, the elastic pliers jaw 81 is supported for being pivoted by another swivel pin 82 on the fixed pliers part 77. Here, the swivel pin 82 can for a first alternative be arranged in the region of a first longitudinal extension 83 or for another alternative in a second longitudinal extension 84 of the elastic pliers jaw 81. The first longitudinal extension might e.g. correspond approximately to the half of the longitudinal extension of the elastic pliers jaw 81 whereas the second longitudinal extension 84 might e.g. be arranged with a distance of ⅓ to ¼ of the elastic pliers jaw 81 from the swivel pin 80. Accordingly, the elastic pliers jaw 81 comprises a freely protruding pliers jaw section 85. In the free end region of the pliers jaw section 85 the bearing eye 70 is arranged. The elasticity (in particular the stiffness of the material and/or the cross section and the second moment of area) of the elastic pliers jaw 81 is chosen such that for sufficiently high crimping forces an elastic bending or compensating movement of the elastic pliers jaw 81 and together therewith of the bearing eye 70 is possible. In this way a force-displacement compensating element 86 is provided.

In one end region a moveable hand lever 37 is linked by a pivot bearing 88 with a swivel pin 89 to a movable pliers jaw 90. The moveable pliers jaw 90 is further supported for being pivoted by a pivot bearing 91 with a swivel pin 92 to the fixed pliers part 77. Furthermore, the moveable hand lever 87 is also connected by a pivot bearing 93 with a swivel pin 94 to a pressure lever 95. In one end region the pressure lever 95 is linked by a pivot bearing 96 with a swivel pin 97 to the fixed pliers part 77. An opening spring 104 is effective between the moveable pliers jaw 90 and the elastic pliers jaw 81. The moveable hand lever 87, the pressure lever 95 and the linkage of the moveable hand lever 87 to the moveable plies jaw 90 forms a toggle lever drive 98. A toggle joint 99 of the toggle lever drive 98 is formed by a pivot bearing 93. A first toggle lever is formed by the pressure lever 95 in the section between the pivot bearings 93, 96. A second toggle lever is formed by the movable hand lever 87 in the section between the pivot bearings 88, 93. In the end regions arranged at the bit of tongs the moveable pliers jaw 90 and the elastic pliers jaw 81 each form a bearing eye 70. The bearing bodies 7 of the die half units 2, 3 of the crimping pliers die 1 are assembled in the bearing eyes 70.

Figure 7:
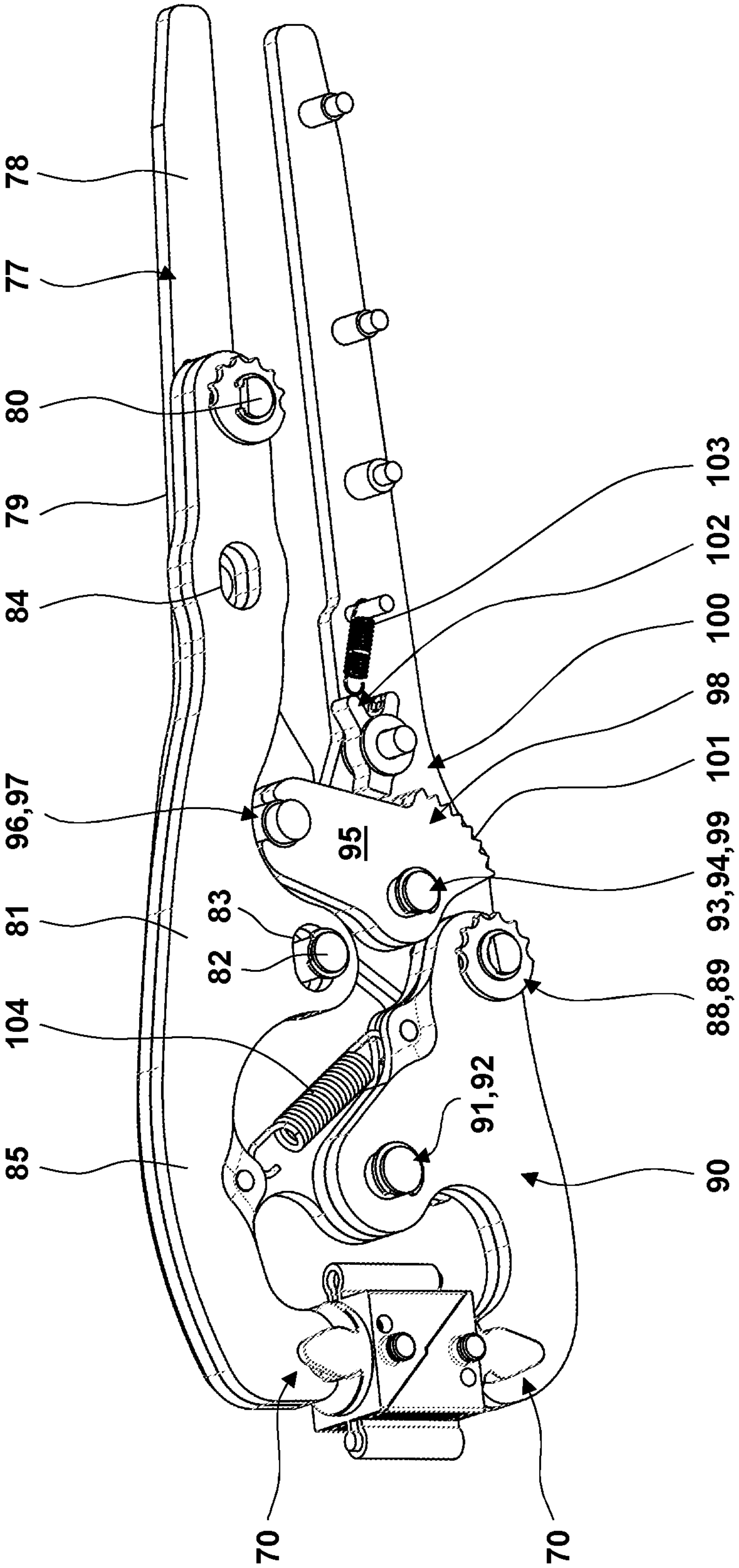
FIG. 7 in a three-dimensional view shows the assembled crimping pliers of FIG. 6 without a front fixed pliers part plate in a three-dimensional view.

In FIGS. 6 and 7 it can be seen that the crimping pliers 87 have a plate construction where single plates might consist of a plurality of sub-plates.

For the shown embodiments the crimping pliers 67 also comprise a forced locking unit 100. The forced locking unit 100 provides that the crimping stroke can be run through also in a number of crimping substeps where after the respective crimping substeps an opening of the crimping pliers 67 is avoided by the forced locking unit 100. Instead, an opening of the crimping pliers 67 is only allowed by the forced locking unit 100 when the crimping stroke and so all of the crimping substeps have completely been run through. For the shown embodiment the forced locking unit 100 comprises an outer toothing 101 of the pressure lever 95, a locking pawl 102 and a locking pawl spring 103.

Figure 8:
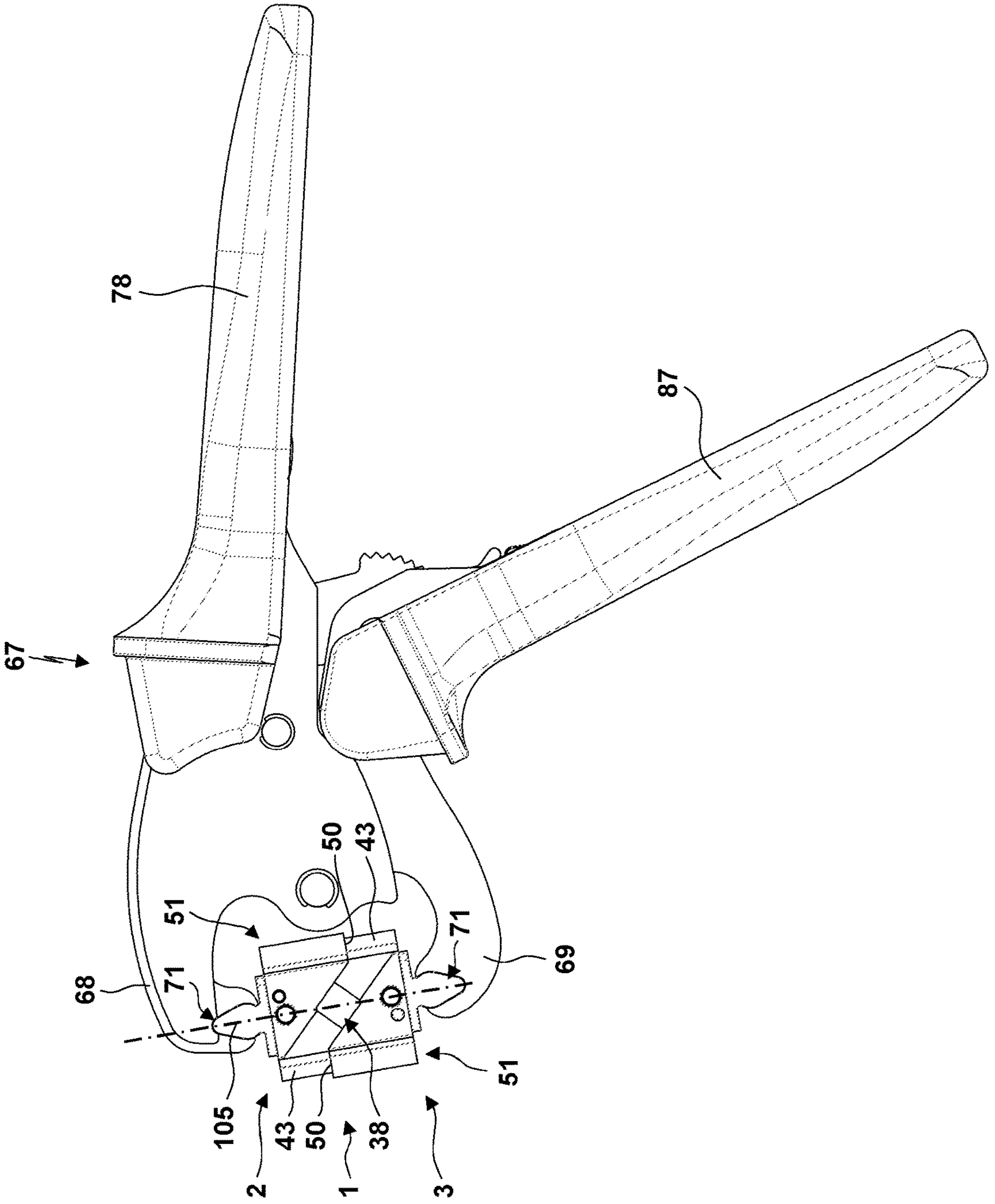
FIG. 8 shows crimping pliers in an open position of the hand levers and of the pliers jaws.
Figure 9:
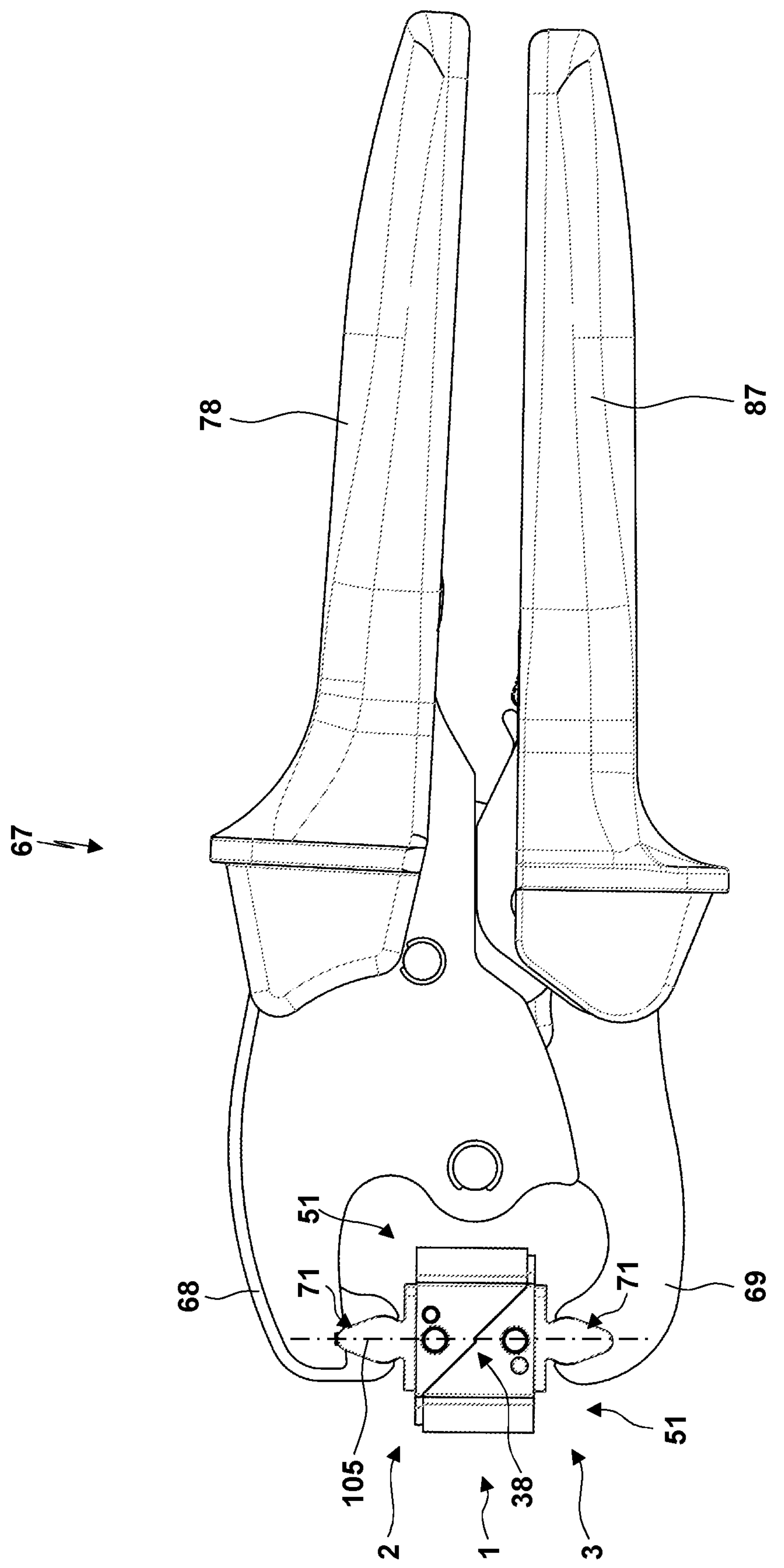
FIG. 9 shows the crimping pliers of FIG. 8 in a closed position of the hand levers and of the pliers jaws.

FIG. 8 shows crimping pliers 67 with the crimping pliers die 1 held thereon in an open position whereas FIG. 9 shows the crimping pliers 67 in a closed position. It can be seen that in the open position the guiding rods 43 of the die half units 2, 3 are partially arranged outside from the guiding recesses 50 of the die half units 2, 3. The die accommodation 38A has a large cross section. Instead, in FIG. 9 the guiding rods 43 have further entered or completely entered into the guiding recesses 50 so that the die accommodation 38 has a smaller cross section. A connecting axis of the rotational axis of the rotational axes 72 of the two die half units 2, 3 forms a crimping axis 105. A crimping force is generated that acts in the direction of the crimping axis 105. The crimping force is applied via the crimping surfaces 39, 40 onto the outer surface of the workpiece which is arranged in the die accommodation 38.

The design of the guide 51 can be used for any design of the die halves 5, in particular also for die halves 5 that are not embodied as rib dies comprising ribs 37.

For the embodiments shown in the Figures the thickening 42 which forms the guiding rods 43 is formed by a lateral end region of one single rib 37. Within the frame of the invention it is also possible that the thickening 42 is formed by the lateral end regions of two ribs 37 being arranged directly adjacent to each other or also remote from each other or the thickening might be formed by a plurality of ribs 37.

For the embodiments shown in the Figures the guiding recess 50 is formed by the lateral end region of two adjacent ribs 37. Within the frame of the invention it is also possible that the guiding recess 50 is only formed by one single rib 37, a lateral end region of this single rib 37 then extending around the guiding rod 43 from one side or the guiding recess 50 is formed by the end regions of two ribs 37 not being arranged directly adjacent to each other (or even by more than two ribs 37).

For the embodiment shown in the Figures the rotational bearing 34 which allows the common rotation of the die halves 5 about the pivot axis 35 is an integral component of the inventive crimping pliers die 1. The crimping pliers die 1 formed in this way might then be linked by the holding body 4 to a pliers jaw of the crimping pliers which for the shown embodiment is the case with an additional pivoting degree of freedom. However, the invention also covers an embodiment of a crimping pliers die comprising two die half units 5 where the crimping pliers die 1 does not form the complete rotational bearing 34. Instead, the crimping pliers die 1 only forms the rotational bearing element 106 of the rotational bearing 34. For the shown embodiment the rotational bearing element 106 might e.g. be a bearing eye with a rotational bearing bore 30 (or a bearing journal).

Many variations and modifications may be made to the preferred embodiments of the invention without departing substantially from the spirit and principles of the invention. All such modifications and variations are intended to be included herein within the scope of the present invention, as defined by the following claims.

We claim:

1. A crimping pliers die for crimping a workpiece, the crimping pliers die comprising
- a) two die half units with die halves,
  - aa) the die halves having a degree of freedom for a movement relative to each other along a crimping axis over a crimping stroke,
  - ab) the die half units each comprising a rotational bearing element defining an axis of rotation for a rotation of the die halves, the first axis of rotation having an orientation coaxial or parallel to the crimping axis,
- b) a die accommodation defining an accommodation axis, the die accommodation being defined by the die halves and accommodating the workpiece,
- c) a stop body,
- d) a stop body rotational bearing which supports the stop body on a first one of the die halves for being rotated about a stop body rotational axis, the stop body rotational axis having an orientation coaxial or parallel to the die accommodation,
- e) the stop body comprising at least two insertion stops being arranged with a distance from each other along the circumference of the stop body rotational axis
- f) the stop body having a first rotational degree of freedom and a second rotational degrees of freedom,
  - fa) the first rotational degree of freedom being provided by the rotational bearing element and being a rotation of the stop body together with the die halves about the axis of rotation and
  - fb) the second rotational degree of freedom being provided by the stop body rotational bearing and being a rotation of the stop body relative to the first one of the die halves about the stop body rotational axis,
- g) a stop body latching device or stop body locking device which latches or locks the stop body in predefined stop body rotational angles,
- h) the stop body and the first one of the die halves each comprise stop body guiding surfaces
  - ha) the stop body guiding surfaces having an orientation vertical to the stop body rotational axis and
  - hb) the stop body and the first one of the die halves being guided on the stop body guiding surfaces relatively to each other during the rotation about the stop body rotational axis,
- i) a first one of the stop body guiding surfaces comprising a recess wherein a stop body latching element or stop body locking element being biased by a spring is arranged and
- j) a second one of the stop body guiding surfaces comprising stop body latching recesses or stop body locking recesses wherein the stop body latching element or stop body locking element is arranged in the predefined relative stop body rotational angles for providing the locking or latching effect.

2. The crimping pliers die of claim 1, wherein the stop body rotational bearing comprises a stop body bearing protrusion which extends through a stop body rotational bearing bore of the stop body and which comprises an axial securing element on the side of the stop body facing away from the first one of the die halves.

3. The crimping pliers die of claim 1, wherein the die half units are guided by a guide relatively to each other over the crimping stroke, the guide comprising at least one guiding rod which is held by one of the die half units and which is guided in a guiding recess of the other one of the die half units.

4. The crimping pliers die of claim 3, wherein the die halves comprise ribs, front faces of the ribs forming crimping surfaces and the ribs engaging with each other.

5. The crimping pliers die of claim 4, wherein the guiding rod is formed by a thickening arranged in an end region of at least one rib of one of the die halves.

6. The crimping pliers die of claim 5, wherein the guiding recess is formed by a guiding recess section which extends from an end region of at least one rib, the guiding recess section having an open edge in a cross section and comprising a guiding surface having the shape of a segment of a cylinder.

7. The crimping pliers die of claim 4, wherein the guiding recess is formed by a guiding recess section which extends from an end region of at least one rib, the guiding recess section having an open edge in a cross section and comprising a guiding surface having the shape of a segment of a cylinder.

8. The crimping pliers die of claim 1, wherein the die halves comprise ribs, front faces of the ribs forming crimping surfaces and the ribs engaging with each other.

9. The crimping pliers die of claim 1, wherein at least one die half unit comprises a bearing part by which it is possible to assemble the die half unit on a pliers jaw with an additional pivoting degree of freedom about a pivot axis having an orientation vertical to a pivoting plane of the pliers jaw.

10. The crimping pliers die of claim 9, wherein the bearing part comprises a bearing body having a guiding surface having the shape of a segment of a cylinder with a guiding diameter and comprising an insertion surface where the extension of the bearing body is smaller than the guiding diameter.

11. Crimping pliers comprising pliers jaws which hold die half units of a crimping pliers die of claim 1.

12. The crimping pliers of claim 11, wherein at least one die half unit is supported by a force-displacement compensating element.

13. A crimping pliers die for crimping a workpiece, the crimping pliers die comprising a) two die half units with die halves, aa) the die halves having a degree of freedom for a movement relative to each other along a crimping axis over a crimping stroke, ab) the die half units each comprising a rotational bearing element defining an axis of rotation for a rotation of the die halves, the first axis of rotation having an orientation coaxial or parallel to the crimping axis, ac) the die half units each comprising a holding body and ad) the die half units are supported for being rotated about the axis of rotation by rotational bearings on the holding body, b) a die accommodation defining an accommodation axis, the die accommodation being defined by the die halves and accommodating the workpiece, c) a stop body, d) a stop body rotational bearing which supports the stop body on a first one of the die halves for being rotated about a stop body rotational axis, the stop body rotational axis having an orientation coaxial or parallel to the die accommodation, e) the stop body comprising at least two insertion stops being arranged with a distance from each other along the circumference of the stop body rotational axis f) the stop body having a first rotational degree of freedom and a second rotational degrees of freedom, fa) the first rotational degree of freedom being provided by the rotational bearing element and being a rotation of the stop body together with the die halves about the axis of rotation and fb) the second rotational degree of freedom being provided by the stop body rotational bearing and being a rotation of the stop body relative to the first one of the die halves about the stop body rotational axis g) a latching device or locking device interposed between the holding body and the die half, the latching device or locking device latching or locking the die half at predefined relative rotational angles between the holding body and the die half about the axis of rotation, h) wherein the holding body and the die half comprise holding body guiding surfaces, ha) the holding body guiding surfaces having an orientation vertical to the axis of rotation and hb) the holding body and the die half being guided by the holding body guiding surfaces relatively to each other during the rotation about the axis of rotation, i) wherein one of the holding body guiding surfaces comprises a recess in which a latching element or locking element being biased by a spring is arranged and j) wherein the other one of the holding body guiding surfaces comprises latching recesses or locking recesses wherein the latching element or locking element is arranged in the predefined relative rotational angles for providing the latching or locking effect.

14. The crimping pliers die of claim 13, wherein the holding body comprises a bearing protrusion which extends through a rotational bearing bore of the die half and which comprises an axial securing element.

* * * * *